US012811715B2

(12) United States Patent
Tian et al.

(10) Patent No.: US 12,811,715 B2
(45) Date of Patent: Nov. 24, 2026

(54) SHORT RESPONSE FEEDBACK

(71) Applicant: QUALCOMM Incorporated, San Diego, CA (US)

(72) Inventors: Bin Tian, San Diego, CA (US); Alfred Asterjadhi, San Diego, CA (US); George Cherian, San Diego, CA (US); Srinivas Katar, Fremont, CA (US); Youhan Kim, Saratoga, CA (US); Sameer Vermani, San Diego, CA (US); Naveen Kumar Kakani, Flower Mound, TX (US); Ahmed Ragab Elsherif, San Jose, CA (US); Abhishek Pramod Patil, San Diego, CA (US); Xiaolong Huang, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 18/614,192

(22) Filed: Mar. 22, 2024

(65) Prior Publication Data

US 2025/0300760 A1 Sep. 25, 2025

(51) Int. Cl.
*H04L 1/00* (2006.01)
*H04L 1/1607* (2023.01)

(52) U.S. Cl.
CPC .......... *H04L 1/0006* (2013.01); *H04L 1/1614* (2013.01)

(58) Field of Classification Search
None
See application file for complete search history.

(56) References Cited

U.S. PATENT DOCUMENTS

| | | | | |
|---|---|---|---|---|
| 8,830,846 | B2 | 9/2014 | Grandhi et al. | |
| 2017/0279864 | A1* | 9/2017 | Chun | H04L 1/1664 |
| 2018/0054240 | A1* | 2/2018 | Cariou | H04B 7/2612 |
| 2018/0175991 | A1 | 6/2018 | Son et al. | |

FOREIGN PATENT DOCUMENTS

EP 3188431 A2 7/2017

OTHER PUBLICATIONS

International Search Report and Written Opinion—PCT/US2025/020761—ISA/EPO—Jul. 4, 2025.

* cited by examiner

*Primary Examiner* — Anh Ngoc M Nguyen
(74) *Attorney, Agent, or Firm* — Holland & Hart LLP

(57) ABSTRACT

This disclosure provides methods, components, devices and systems for short response feedback. Some aspects more specifically relate to communicating feedback from multiple wireless stations (STAs) to a wireless access point (AP) using fewer resources than conventional techniques. A STA may transmit a feedback packet according to a feedback packet format in response to receiving a trigger packet. The feedback packet format may include a data portion that is free of one or more medium access control fields, begin with training fields that are immediately followed by the data portion, or both. The trigger packet may trigger the transmission of the feedback packet via techniques which may be backwards compatible, reduce an overhead associated with the triggering of feedback from multiple STAs, or both. For example, a STA may transmit the feedback packet in accordance with a value of an uplink length frame of the trigger packet.

20 Claims, 10 Drawing Sheets

SHORT RESPONSE FEEDBACK

TECHNICAL FIELD

This disclosure relates generally to wireless communication and, more specifically, to short response feedback.

DESCRIPTION OF THE RELATED TECHNOLOGY

Wireless communication networks are widely deployed to provide various types of communication content such as voice, video, packet data, messaging, broadcast, and so on. Some wireless communication networks may be capable of supporting communication with multiple users by sharing the available system resources (such as time, frequency, or power). Further, a wireless communication network may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM), among other examples. Wireless communication devices may communicate in accordance with any one or more of such wireless communication technologies, and may include wireless stations (STAs), wireless access points (APs), user equipment (UEs), network entities, or other wireless nodes.

In some wireless communication networks, a STA may transmit feedback information to an AP. In some examples, the feedback information may indicate one or more pieces of information associated with the STA. In some examples, the STA may transmit the feedback information in response to receiving a trigger packet (such as, trigger based feedback).

SUMMARY

The systems, methods, and devices of this disclosure each have several innovative aspects, no single one of which is solely responsible for the desirable attributes disclosed herein.

A method for wireless communication by a STA is described. The method may include receiving a first packet, the first packet triggering transmission of feedback information from the STA according to a defined feedback packet format and transmitting a second packet according to the defined feedback packet format in response to receiving the first packet, the second packet including the feedback information within a data portion of the second packet, the data portion being free of a MAC address fields, a packet control field, a duration field, an identification field, MPDU delimiters, or any combination thereof.

A STA for wireless communication is described. The STA may include a processing system that includes processor circuitry and memory circuitry that stores code. The processing system may be configured to cause the STA to receive a first packet, the first packet triggering transmission of feedback information from the STA according to a defined feedback packet format and transmit a second packet according to the defined feedback packet format in response to receiving the first packet, the second packet including the feedback information within a data portion of the second packet, the data portion being free of a MAC address fields, a packet control field, a duration field, an identification field, MPDU delimiters, or any combination thereof.

Another STA for wireless communication is described. The STA may include means for receiving a first packet, the first packet triggering transmission of feedback information from the STA according to a defined feedback packet format and means for transmitting a second packet according to the defined feedback packet format in response to receiving the first packet, the second packet including the feedback information within a data portion of the second packet, the data portion being free of a MAC address fields, a packet control field, a duration field, an identification field, MPDU delimiters, or any combination thereof.

Another innovative aspect of the subject matter described in this disclosure can be implemented in a non-transitory computer-readable medium storing code for wireless communication by a STA. The code may include instructions executable by one or more processors to receive a first packet, the first packet triggering transmission of feedback information from the STA according to a defined feedback packet format and transmit a second packet according to the defined feedback packet format in response to receiving the first packet, the second packet including the feedback information within a data portion of the second packet, the data portion being free of a MAC address fields, a packet control field, a duration field, an identification field, MPDU delimiters, or any combination thereof.

In some examples of the method, STAs, and non-transitory computer-readable medium described herein, the second packet may be transmitted according to a fixed transmission mode associated with the defined feedback packet format.

In some examples of the method, STAs, and non-transitory computer-readable medium described herein, a fixed set of MCSs for the second packet, a fixed error checking scheme for the second packet, a fixed number of data symbols in the second packet, or a fixed RU size for transmission of the second packet.

In some examples of the method, STAs, and non-transitory computer-readable medium described herein, the data portion may be one or more of unscrambled, scrambled using a same scrambling seed associated with the first packet, or scrambled using a scrambling seed indicated by the first packet.

In some examples of the method, STAs, and non-transitory computer-readable medium described herein, the feedback information includes one or more of an acknowledgement, a block acknowledgement, a negative acknowledgement, a clear-to-send indication, a link adaptation report, an operating mode parameter, a coexistence parameter, a cross link signal, a buffer status report, a bandwidth query report, a transmit power report, a set of available subchannels, a compressed beamforming report, a contention free termination, a quantity of available spatial streams, a request for preemption, a request to transmit low latency traffic with high priority, an indication of an end of service period, an indication of a start of service period, an indication of a transition at the STA from a first operational mode to a second operational mode, or any combination thereof.

In some examples of the method, STAs, and non-transitory computer-readable medium described herein, receiving the first packet may include operations, features, means, or instructions for receiving, via the first packet, an uplink length field, the second packet being transmitted according to the defined feedback packet format in accordance with a value of the uplink length field satisfying a threshold value.

In some examples of the method, STAs, and non-transitory computer-readable medium described herein, the threshold value includes a minimum time duration of a trigger based PPDU for a length of a symbol within the first packet.

In some examples of the method, STAs, and non-transitory computer-readable medium described herein, receiving the first packet may include operations, features, means, or instructions for receiving, via the first packet, a user information field, the second packet being transmitted according to the defined feedback packet format in accordance with the user information field indicating the STA.

A method for wireless communication by a STA is described. The method may include receiving a first packet, the first packet triggering transmission of feedback information from the STA according to a defined feedback packet format and transmitting a second packet according to the defined feedback packet format in response to receiving the first packet, the second packet beginning with a STF and a LTF, the second packet including the feedback information within a data portion that is directly subsequent to the STF and the LTF and occupies a same set of frequency domain tones as the STF and the LTF.

A STA for wireless communication is described. The STA may include a processing system that includes processor circuitry and memory circuitry that stores code. The processing system may be configured to cause the STA to receive a first packet, the first packet triggering transmission of feedback information from the STA according to a defined feedback packet format and transmit a second packet according to the defined feedback packet format in response to receiving the first packet, the second packet beginning with a STF and a LTF, the second packet including the feedback information within a data portion that is directly subsequent to the STF and the LTF and occupies a same set of frequency domain tones as the STF and the LTF.

Another STA for wireless communication is described. The STA may include means for receiving a first packet, the first packet triggering transmission of feedback information from the STA according to a defined feedback packet format and means for transmitting a second packet according to the defined feedback packet format in response to receiving the first packet, the second packet beginning with a STF and a LTF, the second packet including the feedback information within a data portion that is directly subsequent to the STF and the LTF and occupies a same set of frequency domain tones as the STF and the LTF.

Another innovative aspect of the subject matter described in this disclosure can be implemented in a non-transitory computer-readable medium storing code for wireless communication by a STA. The code may include instructions executable by one or more processors to receive a first packet, the first packet triggering transmission of feedback information from the STA according to a defined feedback packet format and transmit a second packet according to the defined feedback packet format in response to receiving the first packet, the second packet beginning with a STF and a LTF, the second packet including the feedback information within a data portion that is directly subsequent to the STF and the LTF and occupies a same set of frequency domain tones as the STF and the LTF.

In some examples of the method, STAs, and non-transitory computer-readable medium described herein, the second packet may be transmitted according to a fixed transmission mode associated with the defined feedback packet format.

In some examples of the method, STAs, and non-transitory computer-readable medium described herein, the fixed transmission mode includes one or more of a fixed set of MCSs for the second packet, a fixed error checking scheme for the second packet, a fixed number of data symbols in the second packet, or a fixed RU size for transmission of the second packet.

In some examples of the method, STAs, and non-transitory computer-readable medium described herein, the data portion may be one or more of unscrambled, scrambled using a same scrambling seed associated with the first packet, or scrambled using a scrambling seed indicated by the first packet.

A method for wireless communication by an AP is described. The method may include transmitting a first packet, the first packet triggering transmission of feedback information from at least a first STA according to a defined feedback packet format and receiving a second packet according to the defined feedback packet format in response to transmitting the first packet, the second packet beginning with a STF and a LTF, the second packet including the feedback information within a data portion that is directly subsequent to the STF and the LTF and occupies a same set of frequency domain tones as the STF and the LTF.

An AP for wireless communication is described. The AP may include a processing system that includes processor circuitry and memory circuitry that stores code. The processing system may be configured to cause the AP to transmit a first packet, the first packet triggering transmission of feedback information from at least a first STA according to a defined feedback packet format and receive a second packet according to the defined feedback packet format in response to transmitting the first packet, the second packet beginning with a STF and a LTF, the second packet including the feedback information within a data portion that is directly subsequent to the STF and the LTF and occupies a same set of frequency domain tones as the STF and the LTF.

Another wireless access point for wireless communication is described. The AP may include means for transmitting a first packet, the first packet triggering transmission of feedback information from at least a first STA according to a defined feedback packet format and means for receiving a second packet according to the defined feedback packet format in response to transmitting the first packet, the second packet beginning with a STF and a LTF, the second packet including the feedback information within a data portion that is directly subsequent to the STF and the LTF and occupies a same set of frequency domain tones as the STF and the LTF.

Another innovative aspect of the subject matter described in this disclosure can be implemented in a non-transitory computer-readable medium storing code for wireless communication by an AP. The code may include instructions executable by one or more processors to transmit a first packet, the first packet triggering transmission of feedback information from at least a first STA according to a defined feedback packet format and receive a second packet according to the defined feedback packet format in response to transmitting the first packet, the second packet beginning with a STF and a LTF, the second packet including the feedback information within a data portion that is directly subsequent to the STF and the LTF and occupies a same set of frequency domain tones as the STF and the LTF.

In some examples of the method, wireless access points, and non-transitory computer-readable medium described herein, the second packet may be received according to a fixed transmission mode associated with the defined feedback packet format.

In some examples of the method, wireless access points, and non-transitory computer-readable medium described herein, the fixed transmission mode includes one or more of a fixed set of MCSs for the second packet, a fixed error checking scheme for the second packet, a fixed number of data symbols in the second packet, or a fixed RU size for transmission of the second packet.

In some examples of the method, wireless access points, and non-transitory computer-readable medium described herein, transmitting the first packet may include operations, features, means, or instructions for transmitting, via the first packet, an uplink length field, the second packet being received according to the defined feedback packet format in accordance with a value of the uplink length field satisfying a threshold value.

In some examples of the method, wireless access points, and non-transitory computer-readable medium described herein, the threshold value includes a minimum time duration of a transport block PPDU for a symbol resolution used by at least the first STA.

In some examples of the method, wireless access points, and non-transitory computer-readable medium described herein, the first packet includes a user info field indicating a first AID of a set of multiple consecutive AIDs and a last AID of the set of multiple consecutive AIDs and the second packet may be received in accordance with the set of multiple consecutive AIDs including an AID corresponding to the first STA.

In some examples of the method, wireless access points, and non-transitory computer-readable medium described herein, the first packet includes a user info field indicating a first AID of a set of multiple AIDs and a bitmap, each bit of the bitmap corresponds to a respective AID of the set of multiple AIDs, and the second packet may be received in accordance with the first AID and the bitmap indicating an AID corresponding to the first STA.

In some examples of the method, wireless access points, and non-transitory computer-readable medium described herein, the first packet may be of a trigger packet format dedicated to requesting feedback via packets including the defined feedback packet format.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
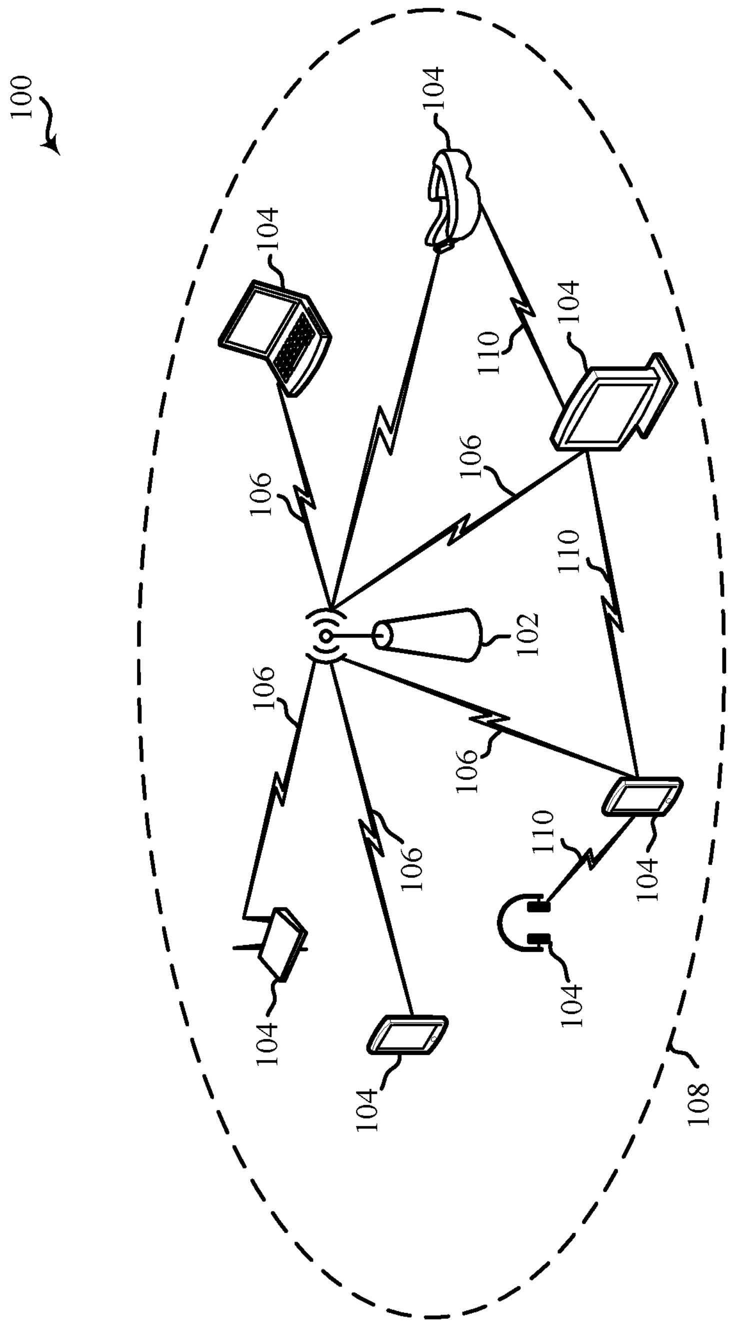
FIG. 1 shows a pictorial diagram of an example wireless communication network that can be an example of a wireless local area network (WLAN) such as a Wi-Fi network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

Various aspects relate generally to feedback in a wireless communication network. Some aspects more specifically relate to communicating feedback from multiple STAs to an AP using fewer resources than conventional techniques. For example, some wireless communication networks may implement one or more techniques for triggering transmission of feedback packets from STAs (such as, trigger based null data packets (NDP) feedback), but the feedback packets may use a relatively high quantity of resources (such as, time resources, frequency or tone resources) for a quantity of bits of feedback communicated per feedback packet.

To lower the signaling overhead, a STA may transmit a feedback packet (such as a feedback frame) according to a feedback packet format (such as a feedback frame format) in response to receiving a trigger packet (such as a trigger frame). The feedback packet may be shorter (such as, use fewer time resources) than one or more other trigger based feedback packet formats (such as the normal trigger based physical layer (PHY) protocol data units (PPDUs)), and the feedback packet may utilize fewer tones (such as, frequency resources) for one or more portions of the feedback packet (such as training fields).

For example, the feedback packet format may be preamble-free (such as excluding one or more fields that may be within a preamble portion of an existing or known PHY PPDU format). As another example, the feedback packet format may include reduced or simplified feedback data (such as compared to other trigger based feedback techniques) within a fixed number of OFDM symbols by leveraging a trigger based UHR PPDU format, such that the AP may receive a feedback packet according to the feedback packet format from a relatively large quantity of STAs (such as 36 STAs per 80 MHz bandwidth) within a time duration.

Additionally, or alternatively, the trigger packet may implement one or more techniques to trigger the transmission of the feedback packet, where the techniques may leverage portions of an existing or known PHY PPDU format for backwards compatibility with STAs capable of receiving packets of the existing or known PHY PPDU format, reduce an overhead associated with the triggering of feedback from multiple STAs, or both. In some examples, the trigger packet may exclude one or more fields that are included in standard trigger packets, may trigger transmission of the feedback packet according to the feedback packet format via a value of an uplink length field, and may indicate one or more STAs that are to transmit feedback packets via a user information field.

Particular aspects of the subject matter described in this disclosure can be implemented to realize one or more of the following potential advantages. In some examples, by transmitting the feedback packet according to the feedback packet format, the described techniques can be used to reduce an overhead associated with collecting feedback in a wireless communication network with a plurality of STAs (such as, up to 36 STAs per 80 MHz). For example, the described feedback packet format may be shorter in duration than one or more other existing feedback packet formats (such as, normal trigger based PPDU), reducing time resource overhead. The feedback packet format also may fewer frequency domain tones for some portions of the feedback packet, which may further reduce the overhead associated with collecting the feedback. Additionally, because some of the techniques for triggering transmission of the feedback packet according to the feedback packet format may be backwards compatible by leveraging portions of an existing or known PHY PPDU format, the described techniques may be used to perform more reliable and efficient feedback collection for a plurality of STAs within a wireless communication networks without significant changes to the existing implementation. Such efficient feedback collection scheme enables AP to better schedule the resource based on the need for each STA and ensure the Quality-of-Service for different applications.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchannels). The terms "channel" and "subchannel" may be used interchangeably herein, as each may refer to a portion of frequency spectrum within a frequency band (such as a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (such as for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (such as UHR- or IEEE 802.11bn-compatible) devices for opportunistic access to spectrum that may be otherwise under-utilized.

Figure 2:
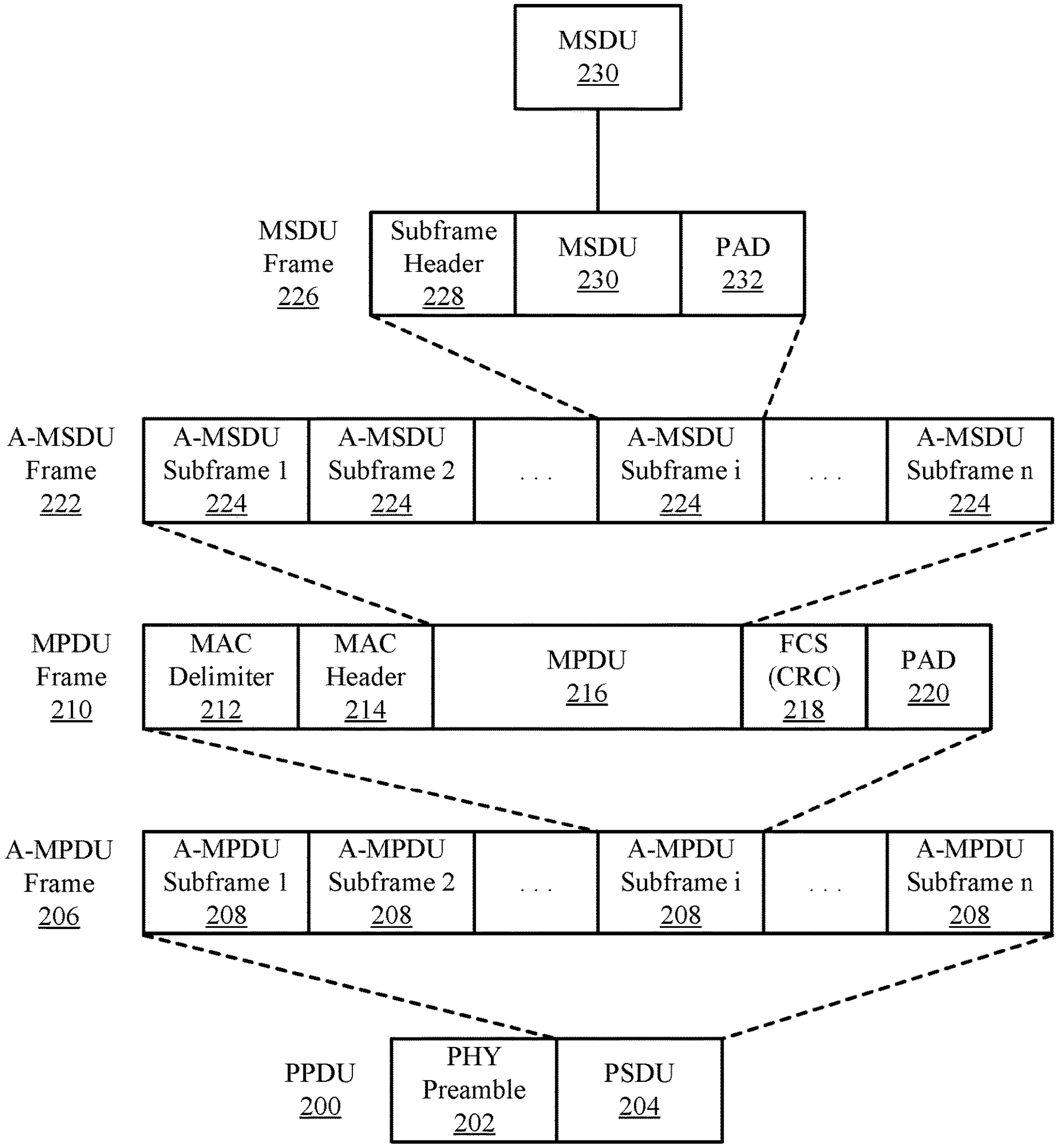
FIG. 2 shows a hierarchical format of an example physical layer protocol data unit (PPDU) usable for communications between a wireless access point (AP) and one or more wireless stations (STAs), where the PPDU may include a physical layer (PHY) preamble and a physical layer service data unit (PSDU).

FIG. 2 shows a hierarchical format of an example PPDU (such as, frame, packet) usable for communications between a wireless AP and one or more wireless STAs. For example, the AP and STAs may be examples of the AP 102 and the STAs 104 described with reference to FIG. 1. As described, each PPDU 200 includes a PHY preamble 202 and a PSDU 204. Each PSDU 204 may represent (or "carry") one or more MAC protocol data units (MPDUs) 216. For example, each PSDU 204 may carry an aggregated MPDU (A-MPDU) 206 that includes an aggregation of multiple A-MPDU subframes 208. Each A-MPDU subframe 208 may include an MPDU frame 210 that includes a MAC delimiter 212 and a MAC header 214 prior to the accompanying MPDU 216, which includes the data portion ("payload" or "frame body") of the MPDU frame 210. Each MPDU frame 210 also may include a frame check sequence (FCS) field 218 for error detection (such as the FCS field 218 may include a cyclic redundancy check)) and padding bits 220. The MPDU 216 may carry one or more MAC service data units (MSDUs) 230. For example, the MPDU 216 may carry an aggregated MSDU (A-MSDU) 222 including multiple A-MSDU subframes 224. Each A-MSDU subframe 224 may be associated with an MSDU frame 226 and may contain a corresponding MSDU 230 preceded by a subframe header 228 and, in some examples, followed by padding bits 232.

Referring back to the MPDU frame 210, the MAC delimiter 212 may serve as a marker of the start of the associated MPDU 216 and indicate the length of the associated MPDU 216. The MAC header 214 may include multiple fields containing information that defines or indicates characteristics or attributes of data encapsulated within the frame body. The MAC header 214 includes a duration field indicating a duration extending from the end of the PPDU until at least the end of an acknowledgement (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 214 also includes one or more fields indicating addresses for the data encapsulated within the frame body. For example, the MAC header 214 may include a combination of a source address, a transmitter address, a receiver address or a destination address. The MAC header 214 may further include a frame control field containing control information. The frame control field may specify a frame type, for example, a data frame, a control frame, or a management frame.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (such as by generating a message integrity check (MIC) for one or more relevant fields.

Retransmission protocols, such as hybrid automatic repeat request (HARQ), also may offer performance gains. A HARQ protocol may support various HARQ signaling between transmitting and receiving wireless communication devices (such as the AP 102 and the STAs 104 described with reference to FIG. 1) as well as signaling between the PHY and MAC layers to improve the retransmission operations in a wireless communication network. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a wireless communication network may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (such as a negative acknowledgment (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

In some implementations, the AP 102 and STAs 104 can support various multi-user communications; that is, concurrent transmissions from one device to each of multiple devices (such as multiple simultaneous downlink communications from an AP 102 to corresponding STAs 104), or concurrent transmissions from multiple devices to a single device (such as multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger packet to initiate and synchronize an UL OFDMA or UL MU-MIMO transmission from multiple STAs 104 to the AP 102. Such trigger packet s may thus enable multiple STAs 104 to send UL traffic to the AP 102 concurrently in time. A trigger packet may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

In some wireless communications systems, an AP 102 may allocate or assign multiple RUs to a single STA 104 in an OFDMA transmission (hereinafter also referred to as "multi-RU aggregation"). Multi-RU aggregation, which facilitates puncturing and scheduling flexibility, may ultimately reduce latency. As increasing bandwidth is supported by emerging standards (such as the IEEE 802.11be standard amendment supporting 320 MHz and the IEEE 802.11bn standard amendment supporting 480 MHz and 640 MHz), various multiple RU (multi-RU) combinations may exist. Values indicating the various multi-RU combinations may be provided by a suitable standard specification (such as one or more of the IEEE 802.11 family of wireless communication protocol standards including the 802.11be standard amendment and the 802.11bn standard amendment).

As Wi-Fi is not the only technology operating in the 6 GHz band, the use of multiple RUs in conjunction with channel puncturing may enable the use of large bandwidths such that high throughput is possible while avoiding transmitting on frequencies that are locally unauthorized due to incumbent operation. Puncturing may be used in conjunction with multi-RU transmissions to enable wide channels to be established using non-contiguous spectrum blocks. In such examples, the portion of the bandwidth between two RUs allocated to a particular STA 104 may be punctured. Accordingly, spectrum efficiency and flexibility may be increased.

As described previously, STA-specific RU allocation information may be included in a signaling field (such as the EHT-SIG field for an EHT PPDU) of the PPDU's preamble. Preamble puncturing may enable wider bandwidth transmissions for increased throughput and spectral efficiency in the presence of interference from incumbent technologies and other wireless communication devices. Because RUs may be individually allocated in a MU PPDU, use of the MU PPDU format may indicate preamble puncturing for SU transmissions. While puncturing in the IEEE 802.11ax standard amendment was limited to OFDMA transmissions, the IEEE 802.11be standard amendment extended puncturing to SU transmissions. In some examples, the RU allocation information in the common field of EHT-SIG can be used to individually allocate RUs to the single user, thereby avoiding the punctured channels. In some other examples, U-SIG may be used to indicate SU preamble puncturing. For example, the SU preamble puncturing may be indicated by a value of the EHT-SIG compression field in U-SIG.

Figure 3:
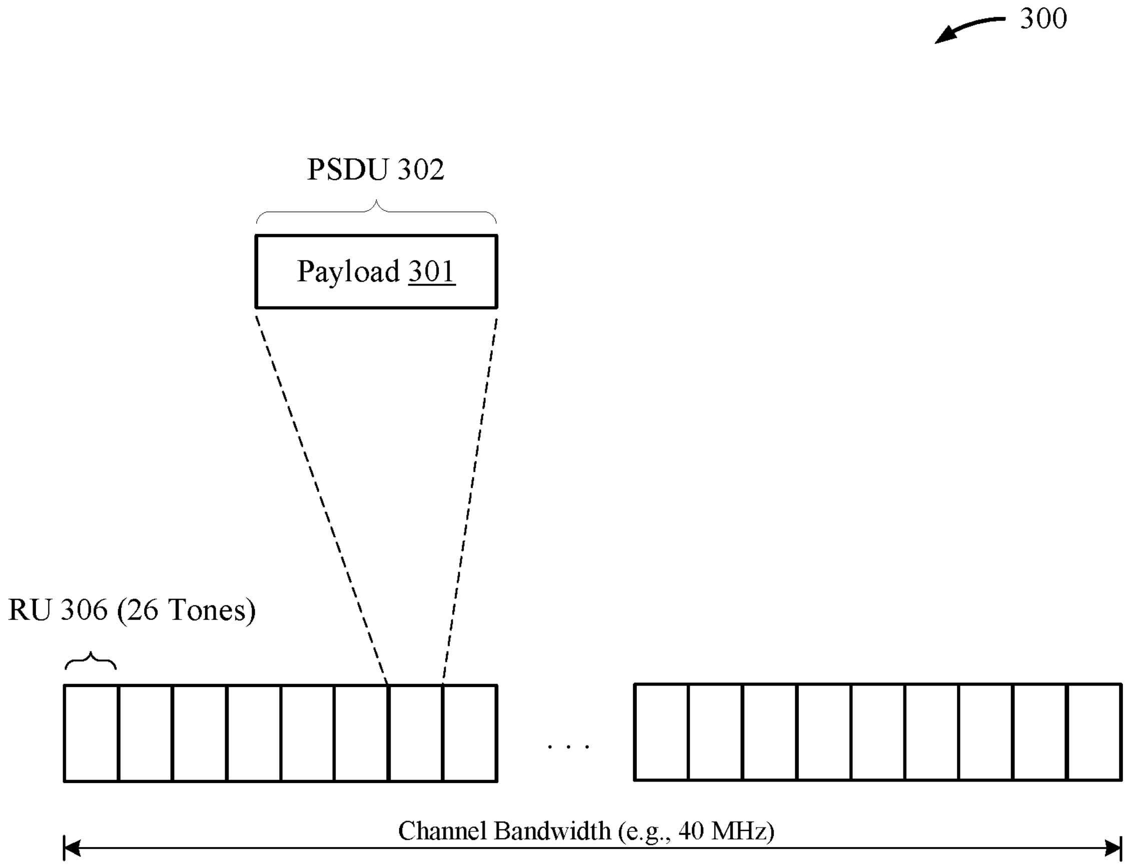
FIG. 3 shows a frequency diagram depicting resource units (RUs) within a bandwidth of a wireless channel, where a STA may be assigned to one or more of the RUs for performing uplink orthogonal frequency division multiple access (OFDMA) transmissions that may each carry a PSDU from the respective STA.

FIG. 3 shows a frequency diagram 300 depicting an example tone mapping (such as a distributed tone mapping). More specifically, FIG. 3 shows an example mapping of the tones associated with a payload 301 of a PSDU 302 for transmission over a portion of a channel bandwidth of a wireless channel. In the illustrated example, the tones associated with the payload 301 may be mapped to one or more RUs 306 (such as a regular RU (rRU), distributed RU (dRU), a standard RU) in accordance with a tone plan. In the example of FIG. 3, a 40 MHz channel bandwidth may include a number (such as 17) RUs, with each RU occupying 26 tones or subcarriers within the channel bandwidth.

Each STA 104 associated with an AP 102 may be assigned to one or more RUs (such as the RU 306) of the channel bandwidth. The STA 104 may transmit frames or packets including the payload 301, other signaling, or both over the assigned one or more RUs. For example, the payload 301 may include feedback according to a defined feedback packet format.

In the wireless communication network 100, the AP 102 may collect feedback from one or more STAs 104. For example, the wireless communication networks may implement a trigger based feedback NDP, where a STA 104 may transmit a quantity feedback bits (such as, 1 feedback bit) in response to receiving a MAC NDP feedback report poll (NFRP) (such as, a trigger packet). For example, the feedback bit may indicate whether the STA is in a power saving mode, and the AP may buffer one or more transmissions for the STA in accordance with the STA being in the power saving mode. In some examples, the trigger based feedback NDP technique may support collecting feedback from a large quantity of STAs 104 (such as, 36 STAs, 296 STAs) in one or more frequencies (such as, 20 MHz, 80 MHz, respectively). However, some trigger based feedback NDP techniques may be incompatible with conventional PHY layer processing. Additionally, some trigger based feedback NDP techniques may provide for a STA 104 to transmit a relatively small quantity of feedback (such as, 1 bit) per triggered feedback packet (such as per 72 μsec PPDU length), which may result in a relatively high signaling overhead for a relatively low feedback payload.

Figure 4A:
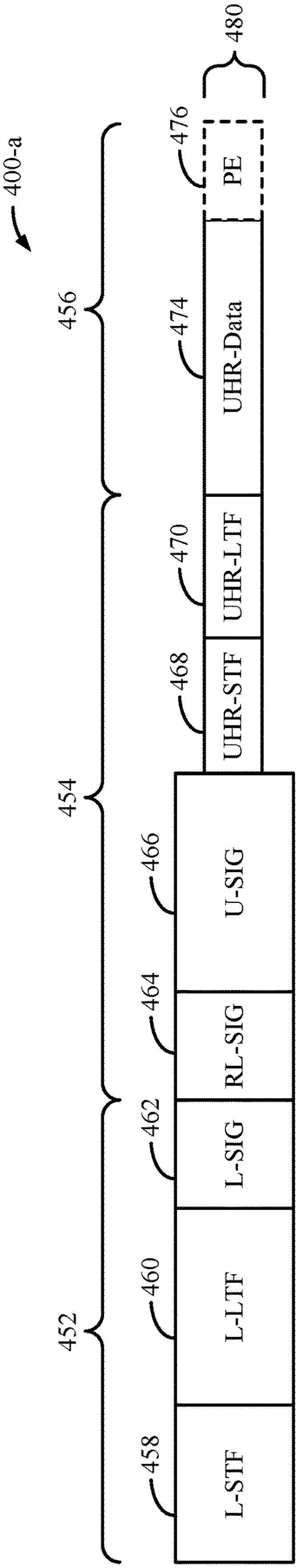
FIGS. 4A and 4B show examples of feedback packet formats usable for communications between a wireless AP and one or more wireless STAs, where the feedback packet formats may utilize less communication resources that other existing feedback packet formats and may support short response feedback.
Figure 4B:
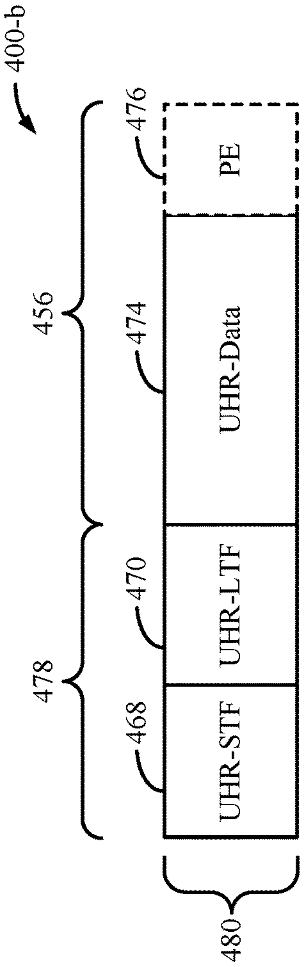

To address these and other challenges, an AP 102 of the wireless communications network 100 may collect feedback from the STAs 104 via a shortened feedback packet format (such as the feedback packet formats 400 described with respect to FIGS. 4A and 4B) leveraging one or more fields from a conventional PHY PPDU format, and the AP 102 may collect the feedback in one PPDU (such as, simultaneously, in a same timeframe). Thus, the wireless communications network 100 may leverage an existing uplink OFDMA PHY PPDU format to communicate trigger based feedback via a short feedback packet (such as, according to the feedback packet formats 400 described with respect to FIGS. 4A 4B). Such techniques may allow for collecting feedback from a large quantity of STAs 104 (such as 36 STAs 104 at a frequency such as 80 MHz) using one or more RUs (such as, RU26, a set of one or more subcarrier indexes) which may be designated for communication of feedback information. Additionally, the present disclosure may define a feedback packet format (such as, a compressed short MAC control packet format, feedback packet formats 400 described with respect to FIGS. 4A and 4B) for transmitting the feedback, where the feedback packet format may fit into a quantity (such as, one or two) of OFDM data symbols (such as, 4×OFDM data symbols) and indicate feedback information.

In some implementations, a STA may transmit a feedback packet according to the feedback packet format (such as, a defined feedback packet format) in response to receiving the trigger packet. In some examples, the feedback packet may begin with (such as, a temporally first field of the feedback packet may include or be) at least one short training field and at least one long training field. Additionally, the second packet may include feedback information within a data portion that may be directly subsequent to (such as, immediately following in time) the at least one short training field and the at least one long training field (such as is described with respect to feedback packet format 400-*b* of FIG. 4B). Additionally, the data portion may occupy a same set of frequency domain tones (such as the RU26) as the short training field and the long training field, where the set of frequency domain tones may include dRUs, rRUs, or both.

FIGS. 4A and 4B show examples of feedback packet formats 400 (such as, defined feedback packet formats, feedback frame formats, a feedback packet format 400-*a* and a feedback packet format 400-*b* respectively) to be used for transmitting a feedback packet. In some examples, one or more features of the feedback packet formats 400 may be similar to features found in a physical layer (PHY) protocol data unit (PPDU), which may be usable for communications between a wireless AP and one or more wireless STAs (such as, the AP 102 and the STAs 104, respectively, described with reference to FIGS. 1-3). As shown, the feedback packet formats 400 may include a payload 456, which may include a UHR data field 474 and an optionally present packet extension field (referred to as PE field 476). In some examples, the UHR data field 474 may include the feedback information in an MPDU. Additionally, or alternatively, the PE field 476 may be appended at the end of either the feedback packet format 400-*a*, the feedback packet format 400-*b*, or both.

For example, a STA 104 may transmit the feedback packet (such as, a second packet) according to one of the feedback packet formats 400 in response to receiving the trigger packet (such as, a first packet), where the feedback packet may include feedback information within an MPDU (such as, such as an A-MPDU 206, an A-MPDU subframe 208, or an MPDU frame 210 described with respect to FIG. 2). The MPDU may be within the UHR data field 474 (such as, a data portion) of the feedback packet. In some examples, the UHR data field 474 may be free of a MAC address field (such as, any MAC address fields), a packet control field, a duration field, an identification field, an MPDU delimiters (such as, any MPDU delimiters), or any combination thereof.

Additionally, or alternatively, the UHR data field 474, the PE field 476, or both, of the feedback packet format 400-*a* may occupy a same subset of tones 480 (such as frequency domain tones) as the UHR-STF 468 and the UHR-LTF 470. For example, the L-STF 458, the L-LTF 460, the L-SIG 462, the RL-SIG 464, the U-SIG 466, or any combination thereof, may occupy a set of tones (such as 20 MHz set of tones described with respect to FIG. 3). The UHR-STF 468, the UHR-LTF 470, the UHR data field 474, the PE field 476, or any combination thereof may occupy the subset of tones 480 of the set of tones (such as a subset of tones allocated to the STA 104 for the UHR data field 474).

As shown, the feedback packet format 400-*a* (such as shown in FIG. 4A) may reuse one or more fields of a PPDU format of one or more other trigger based techniques (such as, a UHR trigger based PPDU, 801.11bn trigger based PPDU format). For example, the feedback packet format 400-*a* may include a PHY preamble that includes a legacy portion 452 and a non-legacy portion 454. In some examples, the legacy portion 452 of the preamble of feedback packet format 400-*a* may include an L-STF 458, an L-LTF 460, and an L-SIG 462. The non-legacy portion 454 of the preamble may include a repetition of L-SIG (such as, RL-SIG 464) and multiple wireless communication protocol version-dependent signal fields after RL-SIG 464. For example, the non-legacy portion 454 may include a universal signal field (referred to as "U-SIG 466"), an UHR signal field, or both. The presence of RL-SIG 464 and U-SIG 466 may indicate to UHR or later version-compliant STAs 104 that a packet utilizing the feedback packet format 400-*a* is an UHR PPDU or a PPDU conforming to any later (post-UHR) version of a new wireless communication protocol conforming to a future IEEE 802.11 wireless communication protocol standard. U-SIG 466 (such as, and the UHR signal field may be structured as, and carry version-dependent information for, other wireless communication protocol versions associated with amendments to the IEEE family of standards beyond UHR. For example, U-SIG 466 may be used by a receiving device (such as an AP 102 or a STA 104) to interpret bits in the UHR data field 474. Like L-STF 458, L-LTF 460, and L-SIG 462, the information in U-SIG 466 may be duplicated and transmitted in each of the component 20 MHz channels in instances involving the use of a bonded channel.

The non-legacy portion 454 of the feedback packet format 400-*a* may further include an additional short training field (referred to as "UHR-STF," although it may be structured as, and is utilized by, other wireless communication protocol versions before or beyond UHR) and one or more additional long training fields (referred to as "UHR-LTFs 470," although they may be structured as, and is utilized by, other wireless communication protocol versions before or beyond UHR). UHR-STF 470 may be used for timing and frequency tracking and AGC, and UHR-LTF may be used for more refined channel estimation.

In some examples, a STA 104 utilizing the feedback packet format 400-*a* may leverage an existing or known PHY PPDU format to transmit the feedback packet. Additionally, or alternatively, the UHR data field 474 of the feedback packet format 400-*a* (such as, and the feedback packet format 400-*b*) may include a fixed quantity of OFDM symbols (such as, one or two OFDM symbols). In some examples, a size of a feedback packet having the feedback packet format 400-*a* may be comparable to a feedback packet of the trigger based feedback NDP techniques (such as, 72 μsec, 62.4 μsec or 76.8 μsec for one or two OFDM data symbols, respectively). However, a feedback packet having the feedback packet format 400-*a* may support a larger quantity of feedback bits per STA 104 than the trigger based feedback NDP techniques.

As shown, the feedback packet format 400-*b* (such as shown in FIG. 4B) may exclude one or more portions included in the feedback packet format 400-*a*. For example, the feedback packet format 400-*b* may exclude the preamble portion, a universal signal field (such as, referred to as U-SIG 466), or both. That is, the feedback packet format 400-*a* may begin with a first portion 478 (such as, excluding a preamble, the temporally first portion being a shortened preamble), and may exclude the legacy portion 452, the RL-SIG 464, and the U-SIG 466, as described with respect to the feedback packet format 400-*a*. For example, the feedback packet format 400-*b* may be preamble-free, as the first portion 478 may exclude one or more preamble fields included in so PPDUs, the one or more preamble fields including the L-STF 458, the L-LTF 460, the L-SIG 462, the RL-SIG 464, the U-SIG 466, or any combination thereof. Additionally, the UHR data field 474 (such as, and the payload 456) may immediately follow the first portion 478, such that the UHR data field 474 may be directly subsequent to the UHR-LTF 470 (such as, or the UHR-STF 468).

For example, the feedback packet format 400-*b* may begin with at least one training field (such as, the UHR-STF 468, the UHR-LTFs 470, in the first portion 478). In some examples, the UHR data field 474 may immediately follow the at least one training field. That is, the UHR data field 474 may be immediately subsequent to the temporally first portion 478, such that there may be no other fields separating the UHR data field 474 and the at least one training field. Additionally, or alternatively, the UHR data field 474 may occupy a same subset of tones 480 (such as frequency domain tones) as the at least one training field in the feedback packet.

In some examples, a trigger packet (such as, that triggers transmission if the feedback packet according to a feedback packet format 400) may provide protection for feedback packets having the feedback packet format 400-*b*. For example, the feedback packet having the feedback packet format 400-*b* may be relatively short (such as, 30.4 μsec or 44.8 μsec for one or two OFDM data symbols in the UHR data field 474, respectively), and thus a U-SIG 466 may not be useful to other (such as, bystander) STAs 104 for the feedback packet.

The feedback packet format 400-*b* may be associated with one or more advantages. For example, the wireless communication network 100 may utilize the feedback packet format 400-*b* by leveraging existing OFDM receiving techniques, and thus may utilize the feedback packet format 400-*b* without using a new PHY PPDU format (such as the trigger based feedback NDP techniques do). Additionally, or alternatively, utilizing the feedback packet format 400-*b* may be more resource efficient than the trigger based feedback NDP techniques, particularly when a quantity of STAs 104 reporting feedback is less than a threshold quantity of STAs 104 (such as, 36 STAs 104) operating at a frequency (such as, an 80 MHz). In some examples, utilizing the feedback packet format 400-*b* also may allow the wireless communication network to support more feedback bits per feedback packet (such as, per STA 104) than the trigger based feedback NDP techniques.

In some examples, the feedback packet (such as, according to the feedback packet formats 400) may include feedback information in the UHR data field 474 (such as, a data portion). The feedback information may include (such as, indicate) various pieces of information. For example, the feedback information may include MAC information associated with the STA 104. In some examples, the MAC information may include one or more of an acknowledgement (such as, of reception of a frame, of transmission of a frame, of one or more other processes), a block acknowledgement, a negative acknowledgement, a clear-to-send indication, or any combination thereof. Additionally, or alternatively, the feedback information may include one or more feedback reports. For example, the one or more feedback reports may include a link adaptation report (such as, indicating a state of the link between the STA 104 and the AP 102 in terms of MCS, coding rate, modulation order), an operating mode parameter (such as, a bandwidth or set of tones for communication between the STA 104 and the AP 102, a quantity of spatial streams (NSS)), a coexistence parameter, a cross link signal, a buffer status report, a bandwidth query report, a transmit power report, a set of available subchannels (such as, available for receiving the trigger packet, available for transmitting the feedback packet, or both), a compressed beamforming report (such as, indicating one or more beam configurations), a contention free termination, a quantity of available spatial streams, a request for preemption, a request to transmit low latency traffic with high priority, an indication of an end of service period, an indication of a start of service period, an indication of a transition (such as, at the STA 104) from a first operational mode (such as, a high power mode, a low power mode, a high performance mode, a low performance mode) to a second operational mode (such as, a corresponding, opposite, or different mode), or any combination thereof.

In some cases, the STA 104 may transmit the feedback packet according to a fixed transmission mode associated with the feedback packet formats 400. For example, the fixed transmission mode may define one or more parameters. In some examples, the one or more parameters may include a fixed set of MCSs for the feedback packet. For example, the STA may transmit the feedback packet using an MCS of a fixed set of MCSs (such as, MCS0, MCS1, higher MCSs). As an example, a STA 104 transmitting the feedback packet using MCS0 or MCS1 may include 12 bits or 24 bits, respectively, per OFDM symbol (such as, which may be included in the UHR data field 474 of the payload 456) using RU size of 26 tones.

The one or more parameters also may include a fixed error checking scheme for the feedback packet. For example, the fixed error checking scheme may include CRC bits (such as, 6 or 8 bits), convolution code (BCC) tail bits (such as, 6 bits), or both, associated with the payload 456. In some examples, a remaining quantity of bits of the payload 456 (such as, 12 bits, with 6 CRC bits may include an MPDU (such as, a compressed MAC feedback or control field).

Additionally, or alternatively, the one or more parameters may include a fixed quantity (such as, limit, number) of data symbols in the feedback packet (such as, included in the UHR data field 474, up to two OFDM data symbols), a fixed resource unit size for transmission of the feedback packet (such as, a quantity (such as, 1) of spatial streams, a quantity of RUs), no both.

In some examples, the STA 104 may or may not scramble the UHR data field 474 (such as, the data portion) of the feedback packet (such as, according to the feedback packet formats 400). For example, the STA 104 may leave the UHR data field 474 unscrambled, scrambled the UHR data field 474 using a same scrambling seed associated with the trigger packet (such as, the scrambling seed used to scramble the trigger packet), or scrambled the UHR data field 474 using a scrambling seed indicated by the trigger packet (such as, indicated in a field of the trigger packet). In some examples, no scrambling seed may be specified in (such as, indicated by) the trigger packet, and the STA 104 may leave the UHR data field 474 unscrambled (such as, refrain from scrambling the UHR data field 474).

Figure 5:
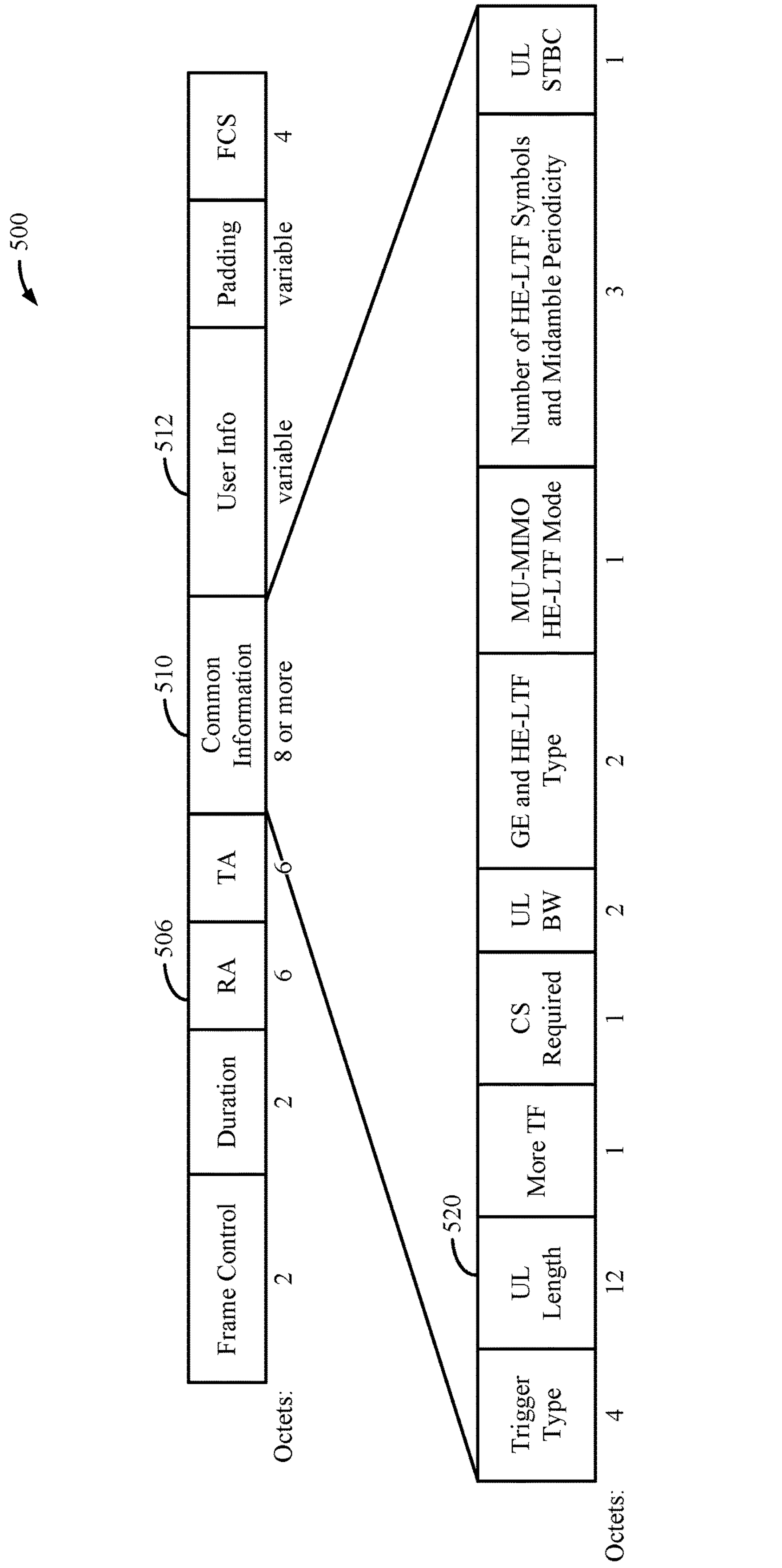
FIG. 5 shows an example of a trigger packet that may be backwards compatible and reduce an overhead associated with triggering short response feedback.

FIG. 5 shows an example of a trigger packet 500 that supports short response feedback. In some examples, aspects of the trigger packet 500 may implement or be implemented by aspects of FIGS. 1-4. For example, an AP 102 may transmit the trigger packet 500 to a STA 104, described with respect to FIGS. 1-4. In some aspects, the STA 104 may receive the trigger packet 500 (such as, a first frame) from the AP 102, where the trigger packet may trigger transmission of the feedback information (such as, within the feedback packet, described with respect to FIGS. 4A and 4B) from the STA 104 according to the feedback packet format (such as, such as the feedback packet formats 400). In some examples, each field of the trigger packet 500 may comprise a quantity of octets of bits (such as shown below each field of the trigger packet 500), where the trigger packet 500 may be associated with a reduced quantity of octets with respect to other existing trigger packet variants.

In some cases, the STA 104 may receive the trigger packet 500 (such as, a short response report poll (SRP) trigger packet) form the AP 102. In a first example, the trigger packet 500 may be modeled after existing trigger variants (such as, BSRP, bandwidth query report poll (BQRP), MU block acknowledgement request (MU BAR), Basic, NFRP). For example, receiving the trigger packet 500 may include receiving, via the trigger packet, an uplink length field 520, which may be included in one or more existing trigger variants. In some examples, the STA 104 may determine to transmit the feedback packet according to a feedback packet format 400 in response to a value of the uplink length field 520. In some examples, the STA 104 may transmit the feedback packet according to a feedback packet format 400 in response to the value of the uplink length field 520 satisfying a threshold value. In some examples, the threshold value may be a minimum time duration of a TB PPDU for a symbol resolution used by the STA 104.

As an example, if the value of the uplink length field 520 is greater than the threshold value (such as, 36 μsec), the trigger packet 500 may trigger the STA 104 to transmit the feedback information via another trigger based PPDU (such as, other than the feedback packet formats 400, non-HT PPDU, HE trigger based PPDU, EHT trigger based PPDU, UHR trigger based PPDU). In some examples, the other trigger based PPDUs may each be longer than the threshold value of the uplink length field 520 (such as, the threshold value may be a minimum time duration of the other trigger based PPDU for a length of a symbol used by the STA 104 and the AP 102). Alternatively, if the value of the uplink length field 520 is equal to the threshold value, less than the threshold value or both, the trigger packet 500 may trigger the STA 104 to transmit the feedback information via a feedback packet format 400.

Utilizing the uplink length field 520 to indicate the use of the feedback packet formats 400 may be associated with one or more advantages. For example, such techniques may be backward compatible, maintaining legacy functionalities for STAs 104 and expanding functionalities for the STAs 104 to include the feedback packets according to the feedback packet formats 400. Additionally, such techniques may include few or no changes to formats, and may utilize a similar or same PHY PPDU format as other signaling methods. Additionally, the wireless communications network 100 may utilize such techniques for initiating control frames (ICF), control response frames (CRF) for dynamic spectrum optimization (DSO), non-primary channel access (NPCA), coexistence, dynamic power savings, or any combination thereof.

The trigger packet 500 may trigger (such as, solicit) feedback information from one or more STAs 104. Although basing the trigger packet 500 on existing trigger variants may allow for backwards compatibility, some of the variants may use one user information field 512 (such as user information field) for each STA 104 that is triggered. Thus, the length of the trigger packet 500 modeled after existing trigger variants (such as, except NFRP) may increase according to a quantity of STAs 104 that are triggered. Additionally, if the trigger packet 500 is modeled after an NFRP trigger variant, the trigger packet may target a plurality of STAs 104 corresponding to a contiguous range of AIDs.

Thus, in some cases, the trigger packet 500 may have a trigger packet format (such as, different from the existing trigger variants). The trigger packet format may be dedicated to requesting feedback via frames having a feedback packet format 400, and may reduce an overhead (such as, resource usage) associated with the trigger packet. For example, the trigger packet format may exclude one or more fields included in one or more of the existing trigger variants, such as an RA field 506 (such as, since AIDs may be indicated in the user information field 512). Additionally, or alternatively, a common info field 510 (such as, which includes the uplink length field 520) may be excluded from the trigger packet format or merged with the user information field 512. For example, a relatively small quantity of bits may be capable of indicating parameters for transmitting a feedback packet according to the feedback packet formats 400. The parameters may include a transmission power, a bandwidth (such as, quantity of tones), a target RSSI, an MCS (such as, MCS0, MCS1, higher MCSs), an uplink length (such as, such described with respect to the uplink length field 520), or any combination thereof. In some examples, the uplink length field 520 also may be excluded from the trigger packet format.

In some examples, the trigger packet format may include an indication of one or more STAs 104 to transmit feedback information. For example, the STA 104 may transmit the feedback packet (such as, according to a feedback packet format 400) in accordance with (such as, in response to) the user information field 512 indicating the STA 104. For example, the user information field 512 may indicate the STA 104 via indicating an AID corresponding to the STA 104.

In a first example, the trigger packet 500 may include one user information field 512 per STA 104 that is triggered to transmit feedback information. For example, each STA 104 may transmit the feedback information in response to determining that a corresponding AID is in a respective user information field 512 of the trigger packet, along with one or more other transmission parameters.

In a second example, the trigger packet may employ an approach similar to an NFRP approach. For example, the user information field 512 may indicate a first AID (such as, a start AID) and a range of consecutive (such as, subsequent) AIDs. Accordingly, the STA 104 may transmit the feedback packet (such as, according to a feedback packet format 400) in accordance with the range of consecutive AIDs (such as, inclusive of the first AID) including the AID corresponding to the STA 104.

In a third example, the trigger packet may have a set of one or more user information fields 512. The set of user information fields 512 may include a subset of user information fields 512 each similar to the first example (such as, the legacy format), such that each user information field 512 of the subset indicates an AID (such as, and transmission resources) for a corresponding STA 104. Additionally, or alternatively, the set of user information field 512 also may include a user information field 512 which indicate a first AID of a plurality of consecutive AIDs and a last (such as, final) AID of the plurality of consecutive AIDs. Accordingly, the STA 104 may transmit the feedback packet (such as, according to a feedback packet format 400) in accordance with the plurality of consecutive AIDs including the AID corresponding to the STA 104. Additionally, or alternatively, the set of user information fields may include a user information fields 512 which indicate a first AID of a plurality of AIDs as well as a bitmap. Each bit of the bitmap may correspond to a respective AID of the plurality of AIDs, such that a "1" value in a bit of the bit map may trigger a STA 104 corresponding to the AID associated with the bit of the bitmap to transmit the feedback packet (such as, to be polled). Thus, the STA 104 may transmit the feedback packet in accordance with the bitmap, in conjunction with the first AID, indicating the AID corresponding to the STA 104.

Additionally, an AP 102 may reuse an existing trigger variant to implement any of the first example, second example, and third example. Alternatively, the AP 102 may utilize a unique trigger packet format (such as, a new trigger packet format, an SRP dedicated trigger packet format) to implement any of the first example, the second example, and the third example.

Figure 6:
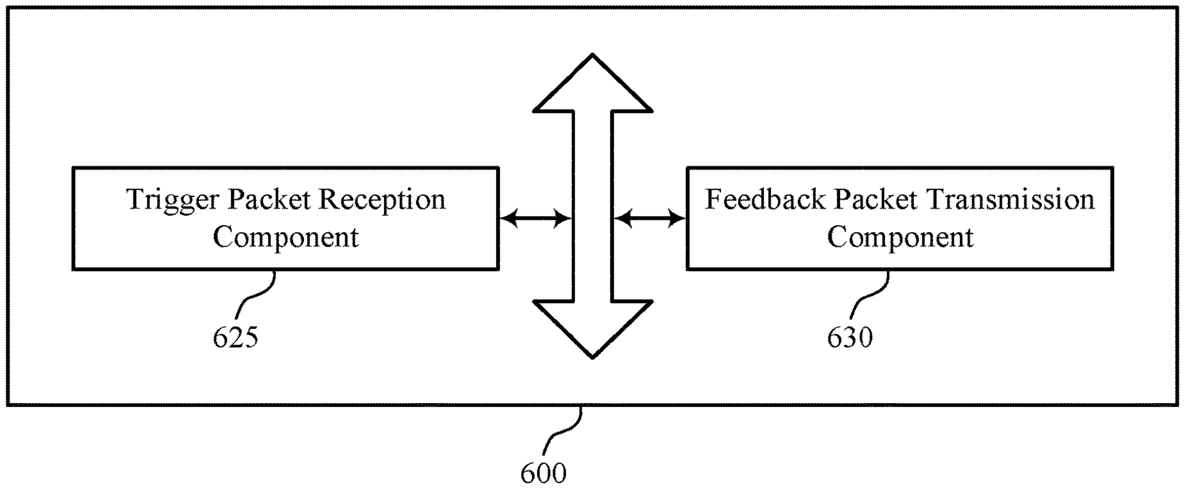
FIG. 6 shows a block diagram of an example wireless communication device that supports short response feedback and may be an example of a STA.

FIG. 6 shows a block diagram of an example wireless communication device 600 that supports short response feedback. In some examples, the wireless communication device 600 is configured to perform the processes 800 and 900 described with reference to FIGS. 8 and 9, respectively. The wireless communication device 600 may include one or more chips, SoCs, chipsets, packages, components or devices that individually or collectively constitute or include a processing system. The processing system may interface with other components of the wireless communication device 600, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 600 may transmit the information output from the chip. In such an example, the second interface may refer to an interface between the processing system of the chip and a reception component, such that the wireless communication device 600 may receive information that is then passed to the processing system. In some such examples, the first interface also may obtain information, such as from the transmission component, and the second interface also may output information, such as to the reception component.

The processing system of the wireless communication device 600 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some implementations, one or more of the multiple memories may be configured to store processor-executable code that, when executed, may configure one or more of the multiple processors to perform various functions described herein (as part of a processing system). In some other implementations, the processing system may be pre-configured to perform various functions described herein.

In some examples, the wireless communication device 600 can be configurable or configured for use in a STA, such as the STA 104 described with reference to FIG. 1. In some other examples, the wireless communication device 600 can be a STA that includes such a processing system and other components including multiple antennas. The wireless communication device 600 is capable of transmitting and receiving wireless communications in the form of, for example, wireless packets. For example, the wireless communication device 600 can be configurable or configured to transmit and receive packets in the form of physical layer PPDUs and MPDUs conforming to one or more of the IEEE 802.11 family of wireless communication protocol standards. In some other examples, the wireless communication device 600 can be configurable or configured to transmit and receive signals and communications conforming to one or more 3GPP specifications including those for 5G NR or 6G. In some examples, the wireless communication device 600 also includes or can be coupled with one or more application processors which may be further coupled with one or more other memories. In some examples, the wireless communication device 600 further includes a user interface (UI) (such as a touchscreen or keypad) and a display, which may be integrated with the UI to form a touchscreen display that is coupled with the processing system. In some examples, the wireless communication device 600 may further include one or more sensors such as, for example, one or more inertial sensors, accelerometers, temperature sensors, pressure sensors, or altitude sensors, that are coupled with the processing system.

The wireless communication device 600 includes a trigger packet reception component 625 and a feedback packet transmission component 630. Portions of one or more of the trigger packet reception component 625 and the feedback packet transmission component 630 may be implemented at least in part in hardware or firmware. For example, one or more of the trigger packet reception component 625 and the feedback packet transmission component 630 may be implemented at least in part by at least a processor or a modem. In some examples, portions of one or more of the trigger packet reception component 625 and the feedback packet transmission component 630 may be implemented at least in part by a processor and software in the form of processor-executable code stored in memory.

The wireless communication device 600 may support wireless communication in accordance with examples as disclosed herein. The trigger packet reception component 625 is configurable or configured to receive a first packet, the first packet triggering transmission of feedback information from the wireless station according to a defined feedback packet format. The feedback packet transmission component 630 is configurable or configured to transmit a second packet according to the defined feedback packet format in response to receiving the first packet, the second packet including the feedback information within a data portion of the second packet, the data portion being free of a medium access control (MAC) address fields, a packet control field, a duration field, an identification field, MAC protocol data unit (MPDU) delimiters, or any combination thereof.

In some examples, the second packet is transmitted according to a fixed transmission mode associated with the defined feedback packet format.

In some examples, the feedback packet transmission component 630 is configurable or configured to transmit the second packet according to one or more of: a fixed set of modulation and coding schemes for the second packet, a fixed error checking scheme for the second packet, a fixed number of data symbols in the second packet, or a fixed resource unit size for transmission of the second packet.

In some examples, the data portion is one or more of unscrambled, scrambled using a same scrambling seed associated with the first packet, or scrambled using a scrambling seed indicated by the first packet.

In some examples, an acknowledgement, a block acknowledgement, a negative acknowledgement, a clear-to-send indication, a link adaptation report, an operating mode parameter, a coexistence parameter, a cross link signal, a buffer status report, a bandwidth query report, a transmit power report, a set of available subchannels, a compressed beamforming report, a contention free termination, a quantity of available spatial streams, a request for preemption, a request to transmit low latency traffic with high priority, an indication of an end of service period, an indication of a start of service period, an indication of a transition at the wireless station from a first operational mode to a second operational mode, or any combination thereof.

In some examples, to support receiving the first packet, the trigger packet reception component 625 is configurable or configured to receive, via the first packet, an uplink length field, the second packet being transmitted according to the defined feedback packet format in accordance with a value of the uplink length field satisfying a threshold value.

In some examples, the threshold value includes a minimum time duration of a trigger based physical protocol data unit for a length of a symbol within the first packet.

In some examples, to support receiving the first packet, the trigger packet reception component 625 is configurable or configured to receive, via the first packet, a user information field, the second packet being transmitted according to the defined feedback packet format in accordance with the user information field indicating the wireless station.

Additionally, or alternatively, the wireless communication device 600 may support wireless communication in accordance with examples as disclosed herein. In some examples, the trigger packet reception component 625 is configurable or configured to receive a first packet, the first packet triggering transmission of feedback information from the wireless station according to a defined feedback packet format. In some examples, the feedback packet transmission component 630 is configurable or configured to transmit a second packet according to the defined feedback packet format in response to receiving the first packet, the second packet beginning with a short training field and a long training field, the second packet including the feedback information within a data portion that is directly subsequent to the short training field and the long training field and occupies a same set of frequency domain tones as the short training field and the long training field.

In some examples, the second packet is transmitted according to a fixed transmission mode associated with the defined feedback packet format.

In some examples, the fixed transmission mode includes one or more of: a fixed set of modulation and coding schemes for the second packet, a fixed error checking scheme for the second packet, a fixed number of data symbols in the second packet, or a fixed resource unit size for transmission of the second packet.

In some examples, the data portion is one or more of unscrambled, scrambled using a same scrambling seed associated with the first packet, or scrambled using a scrambling seed indicated by the first packet.

Figure 7:
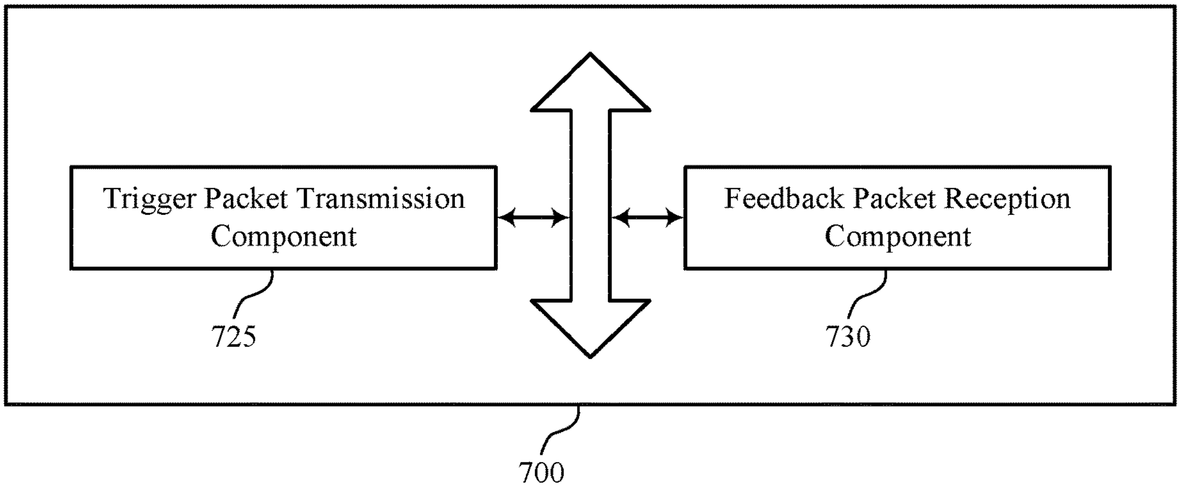
FIG. 7 shows a block diagram of an example wireless communication device that supports short response feedback and may be an example of an AP.

FIG. 7 shows a block diagram of an example wireless communication device 700 that supports short response feedback. In some examples, the wireless communication device 700 is configured to perform the process 1000 described with reference to FIG. 10. The wireless communication device 700 may include one or more chips, SoCs, chipsets, packages, components or devices that individually or collectively constitute or include a processing system. The processing system may interface with other components of the wireless communication device 700, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 700 may transmit the information output from the chip. In such an example, the second interface may refer to an interface between the processing system of the chip and a reception component, such that the wireless communication device 700 may receive information that is then passed to the processing system. In some such examples, the first interface also may obtain information, such as from the transmission component, and the second interface also may output information, such as to the reception component.

The processing system of the wireless communication device 700 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some implementations, one or more of the multiple memories may be configured to store processor-executable code that, when executed, may configure one or more of the multiple processors to perform various functions described herein (as part of a processing system). In some other implementations, the processing system may be pre-configured to perform various functions described herein.

In some examples, the wireless communication device 700 can be configurable or configured for use in an AP, such as the AP 102 described with reference to FIG. 1. In some other examples, the wireless communication device 700 can be an AP that includes such a processing system and other components including multiple antennas. The wireless communication device 700 is capable of transmitting and receiving wireless communications in the form of, for example, wireless packets. For example, the wireless communication device 700 can be configurable or configured to transmit and receive packets in the form of physical layer PPDUs and MPDUs conforming to one or more of the IEEE 802.11 family of wireless communication protocol standards. In some other examples, the wireless communication device 700 can be configurable or configured to transmit and receive signals and communications conforming to one or more 3GPP specifications including those for 5G NR or 6G. In some examples, the wireless communication device 700 also includes or can be coupled with one or more application processors which may be further coupled with one or more other memories. In some examples, the wireless communication device 700 further includes at least one external network interface coupled with the processing system that enables communication with a core network or backhaul network that enables the wireless communication device 700 to gain access to external networks including the Internet.

The wireless communication device 700 includes a trigger packet transmission component 725 and a feedback packet reception component 730. Portions of one or more of the trigger packet transmission component 725 and the feedback packet reception component 730 may be implemented at least in part in hardware or firmware. For example, one or more of the trigger packet transmission component 725 and the feedback packet reception component 730 may be implemented at least in part by at least a processor or a modem. In some examples, portions of one or more of the trigger packet transmission component 725 and the feedback packet reception component 730 may be implemented at least in part by a processor and software in the form of processor-executable code stored in memory.

The wireless communication device 700 may support wireless communication in accordance with examples as disclosed herein. The trigger packet transmission component 725 is configurable or configured to transmit a first packet, the first packet triggering transmission of feedback information from at least a first wireless station according to a defined feedback packet format. The feedback packet reception component 730 is configurable or configured to receive a second packet according to the defined feedback packet format in response to transmitting the first packet, the second packet beginning with a short training field and a long training field, the second packet including the feedback information within a data portion that is directly subsequent to the short training field and the long training field and occupies a same set of frequency domain tones as the short training field and the long training field.

In some examples, the second packet is received according to a fixed transmission mode associated with the defined feedback packet format.

In some examples, the fixed transmission mode includes one or more of: a fixed set of modulation and coding schemes for the second packet, a fixed error checking scheme for the second packet, a fixed number of data symbols in the second packet, or a fixed resource unit size for transmission of the second packet.

In some examples, to support transmitting the first packet, the trigger packet transmission component 725 is configurable or configured to transmit, via the first packet, an uplink length field, the second packet being received according to the defined feedback packet format in accordance with a value of the uplink length field satisfying a threshold value.

In some examples, the threshold value includes a minimum time duration of a transport block physical protocol data unit for a symbol resolution used by at least the first wireless station.

In some examples, the first packet includes a user information field indicating a first association identifier of a set of multiple consecutive association identifiers and a last association identifier of the set of multiple consecutive association identifiers. In some examples, the second packet is received in accordance with the set of multiple consecutive association identifiers including an association identifier corresponding to the first wireless station.

In some examples, the first packet includes a user information field indicating a first association identifier of a set of multiple association identifiers and a bitmap. In some examples, each bit of the bitmap corresponds to a respective association identifier of the set of multiple association identifiers. In some examples, the second packet is received in accordance with the first association identifier and the bitmap indicating an association identifier corresponding to the first wireless station.

In some examples, the first packet is of a trigger packet format dedicated to requesting feedback via packets including the defined feedback packet format.

Figure 8:
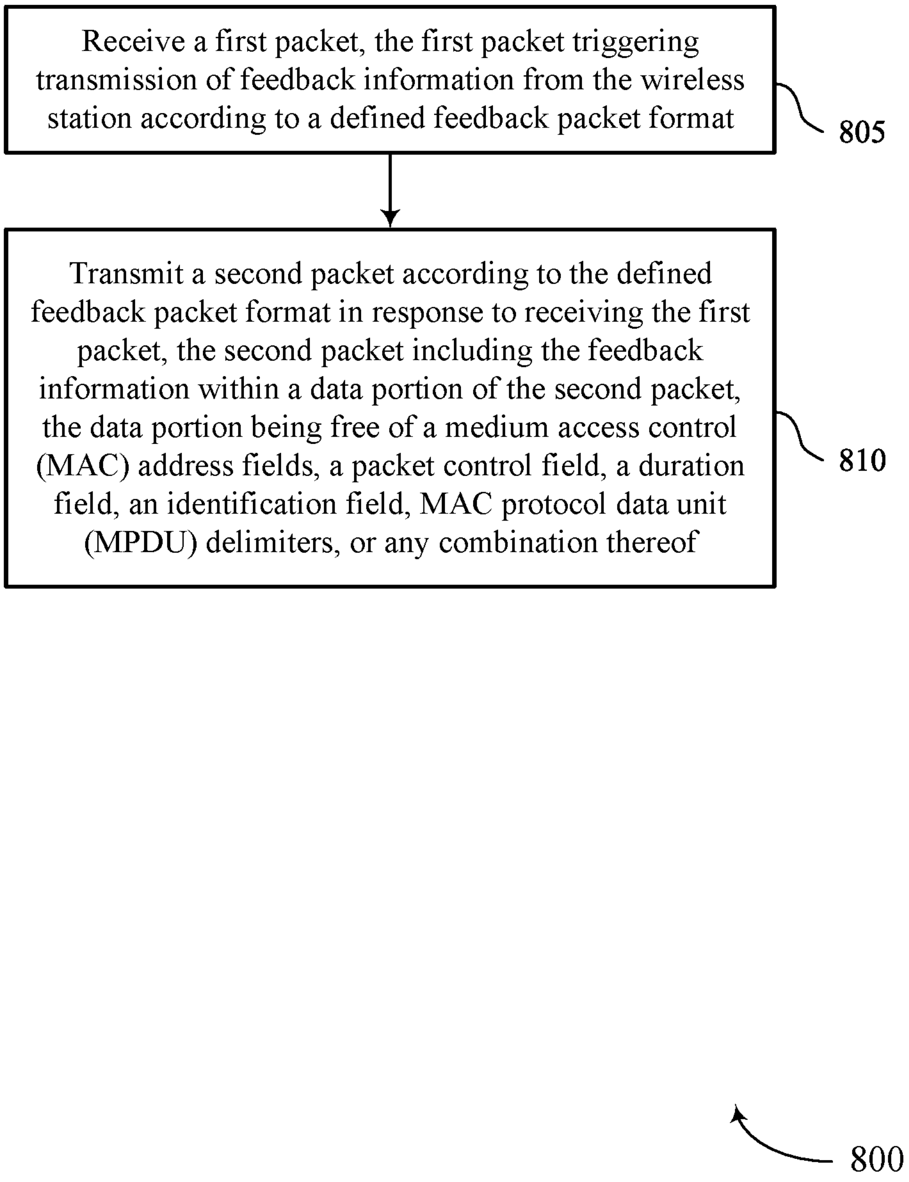
FIGS. 8 and 9 shows a flowchart illustrating an example process performable by or at one or more STAs that supports short response feedback.

FIG. 8 shows a flowchart illustrating an example process 800 performable by or at a wireless station that supports short response feedback. The operations of the process 800 may be implemented by a wireless station or its components as described herein. For example, the process 800 may be performed by a wireless communication device, such as the wireless communication device 600 described with reference to FIG. 6, operating as or within a wireless STA. In some examples, the process 800 may be performed by a wireless STA, such as one of the STAs 104 described with reference to FIG. 1.

In some examples, in 805, the wireless station may receive a first packet, the first packet triggering transmission of feedback information from the wireless station according to a defined feedback packet format. The operations of 805 may be performed in accordance with examples as disclosed herein. In some implementations, aspects of the operations of 805 may be performed by a trigger packet reception component 625 as described with reference to FIG. 6.

In some examples, in 810, the wireless station may transmit a second packet according to the defined feedback packet format in response to receiving the first packet, the second packet including the feedback information within a data portion of the second packet, the data portion being free of a medium access control (MAC) address fields, a packet control field, a duration field, an identification field, MAC protocol data unit (MPDU) delimiters, or any combination thereof. The operations of 810 may be performed in accordance with examples as disclosed herein. In some implementations, aspects of the operations of 810 may be performed by a feedback packet transmission component 630 as described with reference to FIG. 6.

Figure 9:
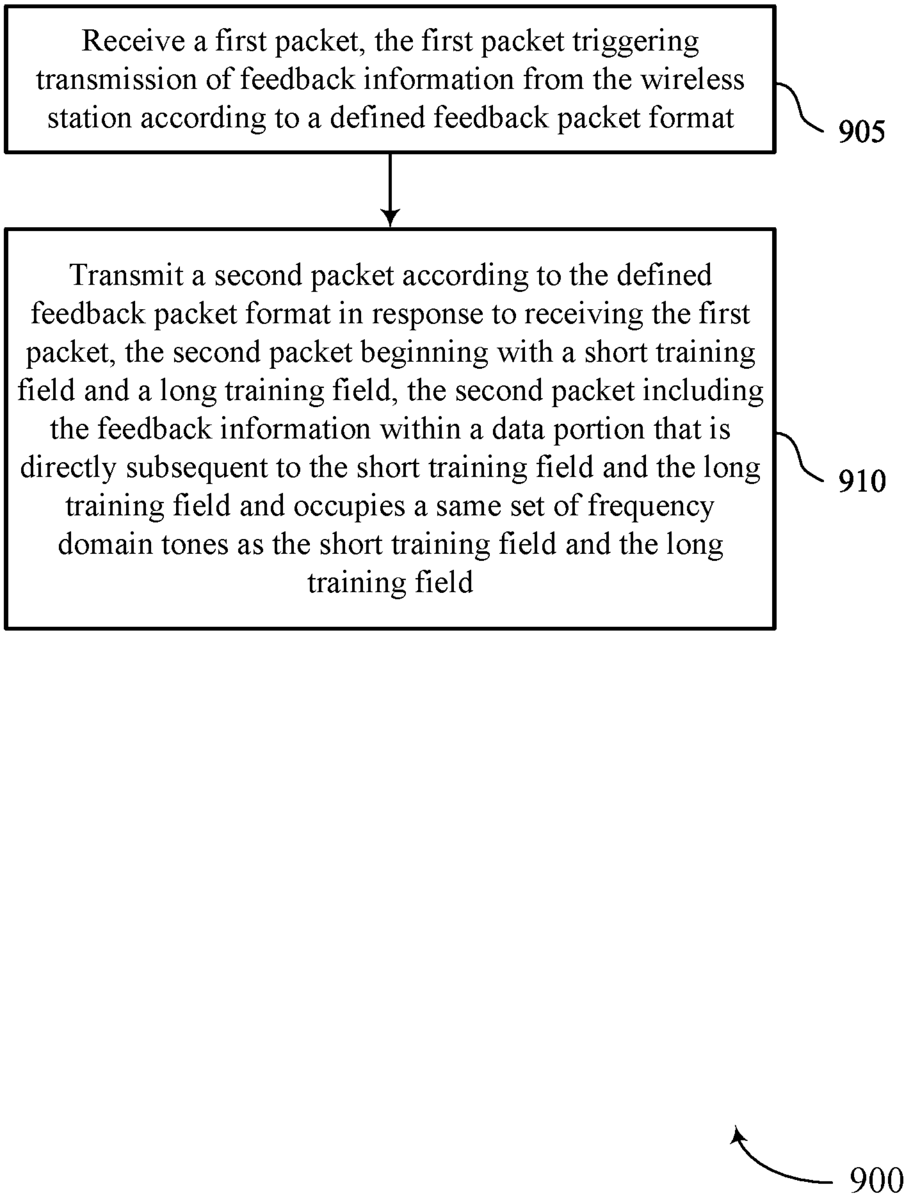

FIG. 9 shows a flowchart illustrating an example process 900 performable by or at a wireless station that supports short response feedback. The operations of the process 900 may be implemented by a wireless station or its components as described herein. For example, the process 900 may be performed by a wireless communication device, such as the wireless communication device 600 described with reference to FIG. 6, operating as or within a wireless STA. In some examples, the process 900 may be performed by a wireless STA, such as one of the STAs 104 described with reference to FIG. 1.

In some examples, in 905, the wireless station may receive a first packet, the first packet triggering transmission of feedback information from the wireless station according to a defined feedback packet format. The operations of 905 may be performed in accordance with examples as disclosed herein. In some implementations, aspects of the operations of 905 may be performed by a trigger packet reception component 625 as described with reference to FIG. 6.

In some examples, in 910, the wireless station may transmit a second packet according to the defined feedback packet format in response to receiving the first packet, the second packet beginning with a short training field and a long training field, the second packet including the feedback information within a data portion that is directly subsequent to the short training field and the long training field and occupies a same set of frequency domain tones as the short training field and the long training field. The operations of 910 may be performed in accordance with examples as disclosed herein. In some implementations, aspects of the operations of 910 may be performed by a feedback packet transmission component 630 as described with reference to FIG. 6.

Figure 10:
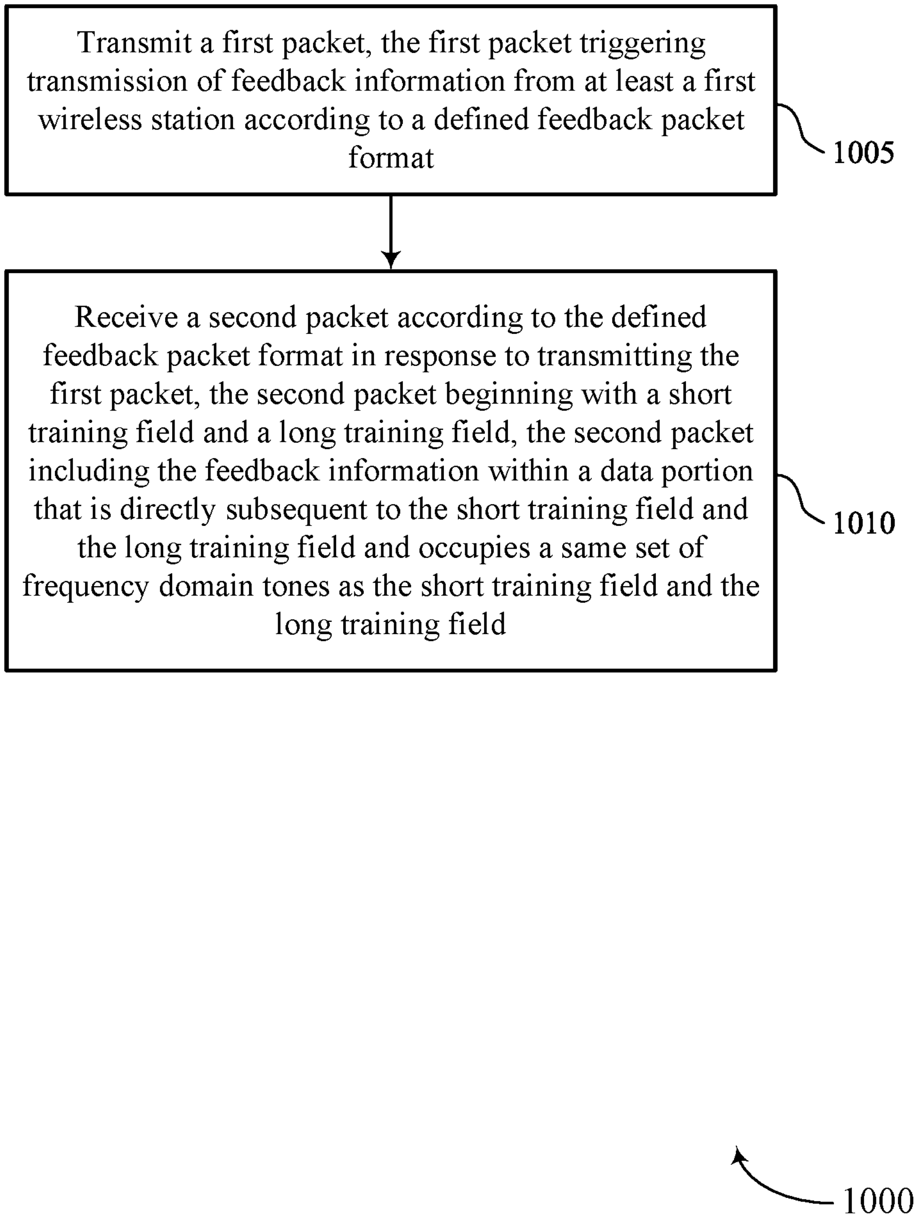
FIG. 10 shows a flowchart illustrating an example process performable by or at an AP that supports short response feedback.

FIG. 10 shows a flowchart illustrating an example process 1000 performable by or at a wireless access point that supports short response feedback. The operations of the process 1000 may be implemented by a wireless access point or its components as described herein. For example, the process 1000 may be performed by a wireless communication device, such as the wireless communication device 700 described with reference to FIG. 7, operating as or within a wireless AP. In some examples, the process 1000 may be performed by a wireless AP, such as one of the APs 102 described with reference to FIG. 1.

In some examples, in 1005, the wireless access point may transmit a first packet, the first packet triggering transmission of feedback information from at least a first wireless station according to a defined feedback packet format. The operations of 1005 may be performed in accordance with examples as disclosed herein. In some implementations, aspects of the operations of 1005 may be performed by a trigger packet transmission component 725 as described with reference to FIG. 7.

In some examples, in 1010, the wireless access point may receive a second packet according to the defined feedback packet format in response to transmitting the first packet, the second packet beginning with a short training field and a long training field, the second packet including the feedback information within a data portion that is directly subsequent to the short training field and the long training field and occupies a same set of frequency domain tones as the short training field and the long training field. The operations of 1010 may be performed in accordance with examples as disclosed herein. In some implementations, aspects of the operations of 1010 may be performed by a feedback packet reception component 730 as described with reference to FIG. 7.

Implementation examples and an overview of aspects of the present disclosure are described in the following numbered clauses:

Aspect 1: A method for wireless communication by a STA, comprising: receiving a first packet, the first packet triggering transmission of feedback information from the STA according to a defined feedback packet format; and transmitting a second packet according to the defined feedback packet format in response to receiving the first packet, the second packet including the feedback information within a data portion of the second packet, the data portion being free of a MAC address fields, a packet control field, a duration field, an identification field, MPDU delimiters, or any combination thereof.

Aspect 2: The method of aspect 1, wherein the second packet is transmitted according to a fixed transmission mode associated with the defined feedback packet format.

Aspect 3: The method of aspect 2, wherein the fixed transmission mode includes one or more of a fixed set of MCSs for the second packet, a fixed error checking scheme for the second packet, a fixed number of data symbols in the second packet, or a fixed RU size for transmission of the second packet.

Aspect 4: The method of any of aspects 1 through 3, wherein the data portion is one or more of unscrambled, scrambled using a same scrambling seed associated with the first packet, or scrambled using a scrambling seed indicated by the first packet.

Aspect 5: The method of any of aspects 1 through 4, wherein the feedback information includes one or more of an acknowledgement, a block acknowledgement, a negative acknowledgement, a clear-to-send indication, a link adaptation report, an operating mode parameter, a coexistence parameter, a cross link signal, a buffer status report, a bandwidth query report, a transmit power report, a set of available subchannels, a compressed beamforming report, a contention free termination, a quantity of available spatial streams, a request for preemption, a request to transmit low latency traffic with high priority, an indication of an end of service period, an indication of a start of service period, an indication of a transition at the STA from a first operational mode to a second operational mode, or any combination thereof.

Aspect 6: The method of any of aspects 1 through 5, wherein receiving the first packet comprises: receiving, via the first packet, an uplink length field, the second packet being transmitted according to the defined feedback packet format in accordance with a value of the uplink length field satisfying a threshold value.

Aspect 7: The method of aspect 6, wherein the threshold value comprises a minimum time duration of a trigger based PPDU for a length of a symbol within the first packet.

Aspect 8: The method of any of aspects 1 through 7, wherein receiving the first packet comprises: receiving, via the first packet, a user information field, the second packet being transmitted according to the defined feedback packet format in accordance with the user information field indicating the STA.

Aspect 9: A method for wireless communication at a STA, comprising: receiving a first packet, the first packet triggering transmission of feedback information from the STA according to a defined feedback packet format; and transmitting a second packet according to the defined feedback packet format in response to receiving the first packet, the second packet beginning with a STF and a LTF, the second packet including the feedback information within a data portion that is directly subsequent to the STF and the LTF and occupies a same set of frequency domain tones as the STF and the LTF.

Aspect 10: The method of aspect 9, wherein the second packet is transmitted according to a fixed transmission mode associated with the defined feedback packet format.

Aspect 11: The method of aspect 10, wherein the fixed transmission mode comprises one or more of a fixed set of MCSs for the second packet, a fixed error checking scheme for the second packet, a fixed number of data symbols in the second packet, or a fixed RU size for transmission of the second packet.

Aspect 12: The method of any of aspects 9 through 11, wherein the data portion is one or more of unscrambled, scrambled using a same scrambling seed associated with the first packet, or scrambled using a scrambling seed indicated by the first packet.

Aspect 13: A method for wireless communication by an AP, comprising: transmitting a first packet, the first packet triggering transmission of feedback information from at least a first STA according to a defined feedback packet format; and receiving a second packet according to the defined feedback packet format in response to transmitting the first packet, the second packet beginning with a STF and a LTF, the second packet including the feedback information within a data portion that is directly subsequent to the STF and the LTF and occupies a same set of frequency domain tones as the STF and the LTF.

Aspect 14: The method of aspect 13, wherein the second packet is received according to a fixed transmission mode associated with the defined feedback packet format.

Aspect 15: The method of aspect 14, wherein the fixed transmission mode includes one or more of a fixed set of MCSs for the second packet, a fixed error checking scheme for the second packet, a fixed number of data symbols in the second packet, or a fixed RU size for transmission of the second packet.

Aspect 16: The method of any of aspects 13 through 15, wherein transmitting the first packet comprises: transmitting, via the first packet, an uplink length field, the second packet being received according to the defined feedback packet format in accordance with a value of the uplink length field satisfying a threshold value.

Aspect 17: The method of aspect 16, wherein the threshold value comprises a minimum time duration of a transport block PPDU for a symbol resolution used by at least the first STA.

Aspect 18: The method of any of aspects 13 through 17, wherein the first packet comprises a user info field indicating a first AID of a plurality of consecutive AIDs and a last AID of the plurality of consecutive AIDs, and the second packet is received in accordance with the plurality of consecutive AIDs comprising an AID corresponding to the first STA.

Aspect 19: The method of any of aspects 13 through 18, wherein the first packet comprises a user info field indicating a first AID of a plurality of AIDs and a bitmap, each bit of the bitmap corresponds to a respective AID of the plurality of AIDs, and the second packet is received in accordance with the first AID and the bitmap indicating an AID corresponding to the first STA.

Aspect 20: The method of any of aspects 13 through 19, wherein the first packet is of a trigger packet format dedicated to requesting feedback via packets comprising the defined feedback packet format.

Aspect 21: A STA for wireless communication, comprising one or more memories storing processor-executable code, and one or more processors coupled with the one or more memories and individually or collectively operable to execute the code to cause the STA to perform a method of any of aspects 1 through 8.

Aspect 22: A STA for wireless communication, comprising at least one means for performing a method of any of aspects 1 through 8.

Aspect 23: A non-transitory computer-readable medium storing code for wireless communication, the code comprising instructions executable by one or more processors to perform a method of any of aspects 1 through 8.

Aspect 24: A STA for wireless communication, comprising one or more memories storing processor-executable code, and one or more processors coupled with the one or more memories and individually or collectively operable to execute the code to cause the STA to perform a method of any of aspects 9 through 12.

Aspect 25: A STA for wireless communication, comprising at least one means for performing a method of any of aspects 9 through 12.

Aspect 26: A non-transitory computer-readable medium storing code for wireless communication, the code comprising instructions executable by one or more processors to perform a method of any of aspects 9 through 12.

Aspect 27: An AP for wireless communication, comprising one or more memories storing processor-executable code, and one or more processors coupled with the one or more memories and individually or collectively operable to execute the code to cause the AP to perform a method of any of aspects 13 through 20.

Aspect 28: An AP for wireless communication, comprising at least one means for performing a method of any of aspects 13 through 20.

Aspect 29: A non-transitory computer-readable medium storing code for wireless communication, the code comprising instructions executable by one or more processors to perform a method of any of aspects 13 through 20.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a wireless station, comprising:

a processing system that includes one or more processors and one or more memories coupled with the one or more processors, the processing system configured to cause the apparatus to:

receive a first packet, the first packet triggering transmission of feedback information from the wireless station according to a defined feedback packet format; and transmit a second packet according to the defined feedback packet format in response to receiving the first packet, the second packet including the feedback information within a data portion of the second packet, the data portion being free of a duration field and one or more of a medium access control (MAC) address fields, a packet control field, an identification field, MAC protocol data unit (MPDU) delimiters, or any combination thereof.

2. The apparatus of claim 1, wherein the second packet is transmitted according to a fixed transmission mode associated with the defined feedback packet format.

3. The apparatus of claim 2, wherein the fixed transmission mode includes one or more of: a fixed set of modulation and coding schemes for the second packet, a fixed error checking scheme for the second packet, a fixed number of data symbols in the second packet, or a fixed resource unit size for transmission of the second packet.

4. The apparatus of claim 1, wherein the data portion is one or more of unscrambled, scrambled using a same scrambling seed associated with the first packet, or scrambled using a scrambling seed indicated by the first packet.

5. The apparatus of claim 1, wherein the feedback information includes one or more of an acknowledgement, a block acknowledgement, a negative acknowledgement, a clear-to-send indication, a link adaptation report, an operating mode parameter, a coexistence parameter, a cross link signal, a buffer status report, a bandwidth query report, a transmit power report, a set of available subchannels, a compressed beamforming report, a contention free termination, a quantity of available spatial streams, a request for preemption, a request to transmit low latency traffic with high priority, an indication of an end of service period, an indication of a start of service period, an indication of a transition at the wireless station from a first operational mode to a second operational mode, or any combination thereof.

6. The apparatus of claim 1, wherein the processing system is configured to cause the apparatus to receive, via the first packet, an uplink length field, the second packet being transmitted according to the defined feedback packet format in accordance with a value of the uplink length field satisfying a threshold value.

7. The apparatus of claim 6, wherein the threshold value comprises a minimum time duration of a trigger based physical protocol data unit for a length of a symbol within the first packet.

8. The apparatus of claim 1, wherein the processing system is configured to cause the apparatus to receive, via the first packet, a user information field, the second packet being transmitted according to the defined feedback packet format in accordance with the user information field indicating the wireless station.

9. An apparatus for wireless communication at a wireless station, comprising:

a processing system that includes one or more processors and one or more memories coupled with the one or more processors, the processing system configured to cause the apparatus to:

receive a first packet, the first packet triggering transmission of feedback information from the wireless station according to a defined feedback packet format; and transmit a second packet according to the defined feedback packet format in response to receiving the first packet, the second packet beginning with a short training field and a long training field, the second packet including the feedback information within a data portion that is directly subsequent to the short training field and the long training field and occupies a same set of frequency domain tones as the short training field and the long training field.

10. The apparatus of claim 9, wherein the second packet is transmitted according to a fixed transmission mode associated with the defined feedback packet format.

11. The apparatus of claim 10, the fixed transmission mode comprising one or more of a fixed set of modulation and coding schemes for the second packet, a fixed error checking scheme for the second packet, a fixed number of data symbols in the second packet, or a fixed resource unit size for transmission of the second packet.

12. The apparatus of claim 9, wherein the data portion is one or more of unscrambled, scrambled using a same scrambling seed associated with the first packet, or scrambled using a scrambling seed indicated by the first packet.

13. An apparatus for wireless communication at a wireless access point (AP), comprising:

a processing system that includes one or more processors and one or more memories coupled with the one or more processors, the processing system configured to cause the apparatus to:

transmit a first packet, the first packet triggering transmission of feedback information from at least a first wireless station according to a defined feedback packet format; and receive a second packet according to the defined feedback packet format in response to transmitting the first packet, the second packet beginning with a short training field and a long training field, the second packet including the feedback information within a data portion that is directly subsequent to the short training field and the long training field and occupies a same set of frequency domain tones as the short training field and the long training field.

14. The apparatus of claim 13, wherein the second packet is received according to a fixed transmission mode associated with the defined feedback packet format.

15. The apparatus of claim 14, wherein the fixed transmission mode includes one or more of: a fixed set of modulation and coding schemes for the second packet, a fixed error checking scheme for the second packet, a fixed number of data symbols in the second packet, or a fixed resource unit size for transmission of the second packet.

16. The apparatus of claim 13, wherein the processing system is configured to cause the apparatus to transmit, via the first packet, an uplink length field, the second packet being received according to the defined feedback packet format in accordance with a value of the uplink length field satisfying a threshold value.

17. The apparatus of claim 16, wherein the threshold value comprises a minimum time duration of a transport block physical protocol data unit for a symbol resolution used by at least the first wireless station.

18. The apparatus of claim 13, wherein the first packet comprises a user information field indicating a first association identifier of a plurality of consecutive association identifiers and a last association identifier of the plurality of consecutive association identifiers, and wherein the second packet is received in accordance with the plurality of consecutive association identifiers comprising an association identifier corresponding to the first wireless station.

19. The apparatus of claim 13, wherein the first packet comprises a user information field indicating a first association identifier of a plurality of association identifiers and a bitmap, wherein each bit of the bitmap corresponds to a respective association identifier of the plurality of association identifiers, and wherein the second packet is received in accordance with the first association identifier and the bitmap indicating an association identifier corresponding to the first wireless station.

20. The apparatus of claim 13, wherein the first packet is of a trigger packet format dedicated to requesting feedback via packets comprising the defined feedback packet format.

* * * * *